Aug. 15, 1950     R. J. DUFOUR     2,519,237

GAS RANGE TESTING PLATE

Filed Dec. 27, 1946

Inventor:
Raymond J. Dufour,

By [signature]

Atty's.

Patented Aug. 15, 1950

2,519,237

UNITED STATES PATENT OFFICE 2,519,237

GAS RANGE TESTING PLATE

Raymond J. Dufour, Wheaton, Ill.

Application December 27, 1946, Serial No. 718,805

1 Claim. (Cl. 73—36)

My invention relates to a device for testing the extent or efficiency of combustion of a fuel delivered to and consumed in a gas burner.

When the composition of gas employed as a fuel is varied as to its B. t. u. content it becomes necessary to make appropriate adjustment of the gas burning apparatus in order to provide proper proportions of fuel and oxygen, so that efficient combustion will take place. It is also desirable to test and adjust new or replacement gas burners in order that they will operate efficiently with the fuel supplied them.

Homes and industrial establishments in a community in which a central source of gas is employed for supplying various gas burning appliances normally have these appliances adjusted for fuel of a determined B. t. u. content. When the supplier of gas changes over to a gas having a different B. t. u. content, it becomes necessary for many of the gas consuming appliances within the community to be adjusted for use with the new fuel. One method employed in determining the proper adjustment for gas consuming appliances has required the measurement of the carbon monoxide which results from incomplete combustion of the gas from an improperly adjusted gas burner. Although such manner of testing may prove satisfactory in a laboratory, it is cumbersome and impractical in the field, that is, in testing appliances scattered throughout a community. Further, such method of testing is usually beyond the capability of the ordinary service man, and it, as well as other known testing methods, is relatively expensive as compared with the manner of testing which my invention provides.

It is an object of my invention to provide a simple and sturdy testing device which the ordinary service man may employ in the field for determining the extent or efficiency of combustion of fuel delivered from a gas burner. It is an advantage of my testing device that it is easily constructed and is much less expensive than testing devices previously employed. The device is particularly well adapted for testing gas burners employed for heating vessels which are supported over the burners, such, for example, as hot water tanks and utensils employed on a gas cooking stove. For purposes of description, the testing device will be illustrated in connection with the top burners of gas cooking stove, such as that employed in the home. It will be understood, of course, that this is merely by way of example.

Since the gas burner, or burners, to be tested operates beneath a vessel, the input of the fuel to the gas burner should be such that the maximum possible amount of gas will be completely burned beneath the vessel being used. The testing device in question is intended, therefore, to define a combustion area which simulates actual operating conditions and to offer a visual means for determining when the best adjustment of a gas burner exists. In this connection, I provide a testing device which presents to the burning fuel a shape and surface which corresponds to the shape and surface of the vessel which will be subjected to such burning fuel, together with means for permitting the heated gases, including those which have not been completely burned, to pass to a locality where excess air is available for further combustion, which combustion is so located as to be visible to the eye of the service man. The burner is then adjusted so that the gas ratio is reduced to a point where such secondary combustion is eliminated. At that point the service man has provided adjustment of the burner which results in complete combustion of the fuel beneath the vessel. Most efficient fuel consumption, therefore, results.

Other objects, uses and advantages of my invention will become apparent from the following description when taken in connection with the drawings in which.

Like reference numerals have been employed in the several views to indicate the same elements.

Figure 1:
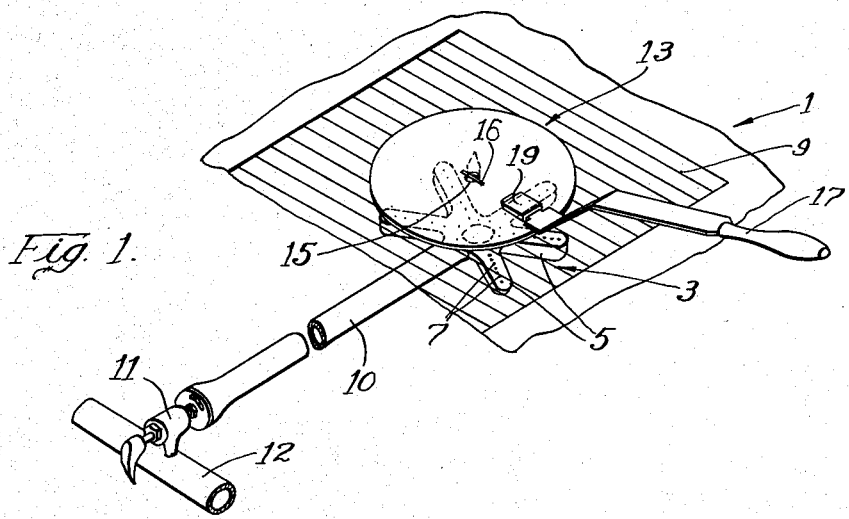
Figure 1 is a perspective view showing the top burner of a domestic gas range with my testing device positioned for testing operations, the dot-dash line indicating the location where a flame may appear above the testing device.

The reference numeral 1 indicates generally a domestic gas range having a plurality of top gas burners, such as the gas burner indicated generally by the reference numeral 3. This burner has a plurality of arms 5, each of which arms has a plurality of orifices 7 through which gas passes vertically upwardly toward a grid 9, which is positioned above the burner for supporting a cooking vessel (not shown). A conduit 10 leads from the burner 3 to control valve 11 for said burner, which valve permits the admission of gas to the burner 3 from the gas manifold 12 of the range 1.

Resting on the grid 9 is one form of testing device or plate of my invention, which plate is indicated generally by the reference numeral 13. The plate is circular, formed of steel, and approximately 7½ inches in diameter, which diameter corresponds to that of a standard vessel recommended for combustion tests by the American Standards Association. A central aperture 15 is approximately ½ inch in diameter and provides a passageway for hot unburned fuel to reach excess air existing above the plate 13 and to thereby burn to completion. The aperture 15 also permits the escape of gases of combustion.

The testing plate 13, as so far described, performs very satisfactorily. However, to render more easy the task of the person who is adjusting the gas burner, I provide a heat resistant wire 16, such as "Chromel" No. 20 gauge, across the aperture 15. The wire 16 makes more visible the presence of a flame at the aperture, which flame is indicative of the escape of unburned fuel from beneath the plate. If desired, the wire may be coated with a salt solution, so that any flame above the plate may be rendered more visible by coloration due to the vaporized salt. A detachable handle 17 is preferably employed in cooperation with a bridge 19 on the plate 13 to make easy the placing and removal of the plate from the grid 9.

It will be appreciated that the plate need not be made of steel or, for that matter, of any metal, so long as it is heat resistant and sturdy, and the same is true of the wire 16 which extends across the aperture 13.

Figure 2:
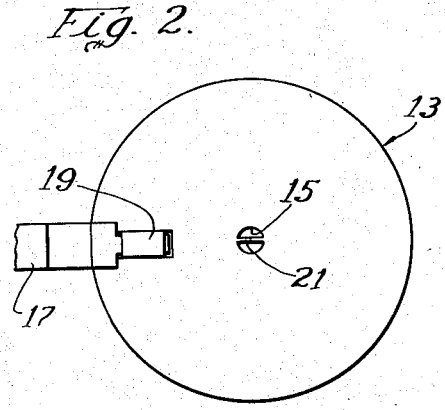
Figure 2 is a plan view on a larger scale of a modified form of testing plate.

In place of the wire there may be substituted a heat resistant screen or a strip, or even an integral portion 21 of the plate itself which will extend across the aperture 15 as shown in Figure 2. Whatever the shape, the member extending across the aperture 15 serves not only to carry a salt which will render any flame more visible, but also varies the shape of the flame depending upon the amount of unburned gases issuing from the aperture 15. Consequently, with a little practice, a man adjusting gas appliances in the field may provide various gradations of adjustment by observing the appearance of any flame above the plate, that is, the heighth of the flame and whether the flame is coalesced, bifurcated, or otherwise formed.

In employing my testing device, the plate 13 is placed on the grid 9 centrally above the lighted burner 3 in a position similar to that of a vessel used for cooking. If too much gas is being supplied to the burner 3, combustion will not be completed beneath the testing plate, and the partially burned gases will issue through the central aperture 15 at an ignition temperature, and burn to completion above the plate 13 where excess air is available. The existence of a flame above the test plate signifies that the gas ratio of the burner is excessive and it is necessary, therefore, to adjust the burner in some appropriate manner. After the service man has adjusted the burner to the point where the flame above the test plate just disappears, a correct adjustment is thereby indicated for gas of that B. t. u. content. In most instances the gas appliances will be adjusted to accommodate a so-called "richer" fuel, that is, a fuel having a greater heat content per unit of volume than the fuel previously used. However, where the fuel being substituted is of a lower B. t. u. rating, it will be desirable for the person testing the appliance first to increase the gas ratio to the point where a flame appears above the test plate, and then to reduce the gas ratio of the burner until the flame above the test plate just disappears.

Figure 3:
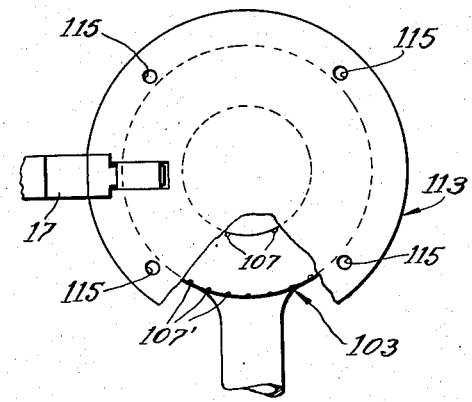
Figure 3 is a plan view of another modified form of testing plate for use with a ring shaped gas burner.

In Figure 3 I have illustrated a modified form of testing plate 113 which more readily lends itself to the testing of a top burner 103 which is ring shaped. This form of burner generally has horizontally directed orifices 107 and 107' for the emission of gas. The apertures 115 of this form of plate are spaced radially outwardly from the center of the plate so as to be substantially above the gas flame at the outer perimeter of the burner 103. If desired, a small central aperture may also be employed, but the illustrated apertures 115 are adapted to give a satisfactory test of the state of combustion beneath the plate 113. Coated wires or screen may be placed over the apertures 115 in the same manner as suggested above with respect to the testing plate 13 of Figure 1.

Figure 5:
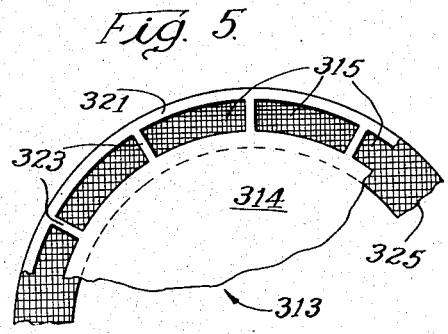
Figure 5 is a fragmentary view of another modification of the testing plate of Figure 3.
Figure 4:
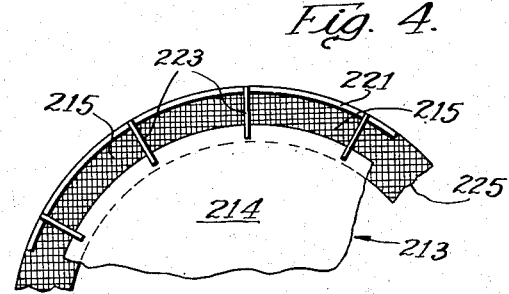
Figure 4 is a fragmentary view of a modification of the testing plate of Figure 3.

Modifications of the plate 113 of Figure 3 are shown in Figures 4 and 5. Figure 4 illustrates a testing plate 213 having a metal disc 214 and a concentric wire rim 221 connected with the edge of the disc by a plurality of radially extending wires 223. In this way apertures 215 are defined near the edge of the testing plate 213. An annular strip of screen 225 may be secured by its inner edge to the disc 214 and by its outer edge to the rim 221. It will be appreciated, however, that the wires 223 alone can serve to indicate the presence of burning gases above the surface of the plate 213, but the screen makes more visible such flame, particularly if the screen is coated with a salt solution which will color the flame when vaporized. Any flame appearing at the apertures 215 and above the plate indicates the escape from beneath the plate 213 of unburned gas, which gas upon reaching excess air above the plate burns to completion.

In Figure 5 the testing plate 313 has apertures 315 formed by a stamping operation which leaves an integral rim 321 joined to the control disc 314 by radially extending arms 323. The arms may be coated with a salt solution which vaporizes in a flame, thus giving color to the flame. As an additional means for identifying the presence of a flame above the apertures 315, a coated screen 325 may be placed across the apertures. The plate is employed in the same manner as the testing plates of Figures 3 and 4.

From the foregoing description, it will be apparent that gas burners which are employed to heat vessels of other sizes will be most appropriately tested by devices having substantially the same shape and surface area as the surface presented by the vessel to the flame, and I do not intend, therefore, to be limited to the illustrated embodiment of my invention, except, insofar as the following claim is so limited.

I claim:

A device for testing the extent of combustion beneath a vessel of a fuel gas delivered by a top burner of a gas range, said device comprising a flat, metal plate having a shape, surface area and thickness corresponding to that surface of a standard cooking vessel which is subjected to the burning fuel, and having an aperture in said plate providing a passageway for any unburned fuel to reach excess air above the plate for combustion, and a heat resistant wire extending across said aperture, said wire being coated with a salt solution whereby vaporized salt will render more visible the existence of a flame at the aperture.

RAYMOND J. DUFOUR.

REFERENCES CITED

The following references are of record in the file of this patent:

FOREIGN PATENTS

| Number | Country | Date |
| --- | --- | --- |
| 22,595 | Great Britain | Nov. 9, 1901 |

OTHER REFERENCES

Textbook "A course in General Chemistry," McPherson & Henderson (Ginn & Co) pages 424–425.